May 2, 1961 D. D. PERRY ET AL 2,982,034
DITCHING ATTACHMENT
Filed May 22, 1959 2 Sheets-Sheet 1
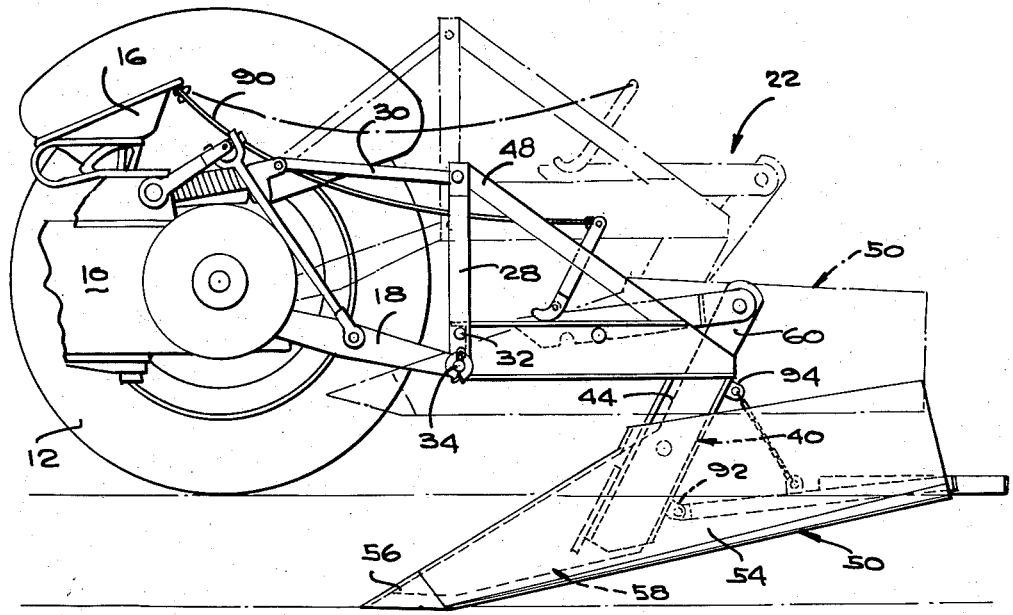
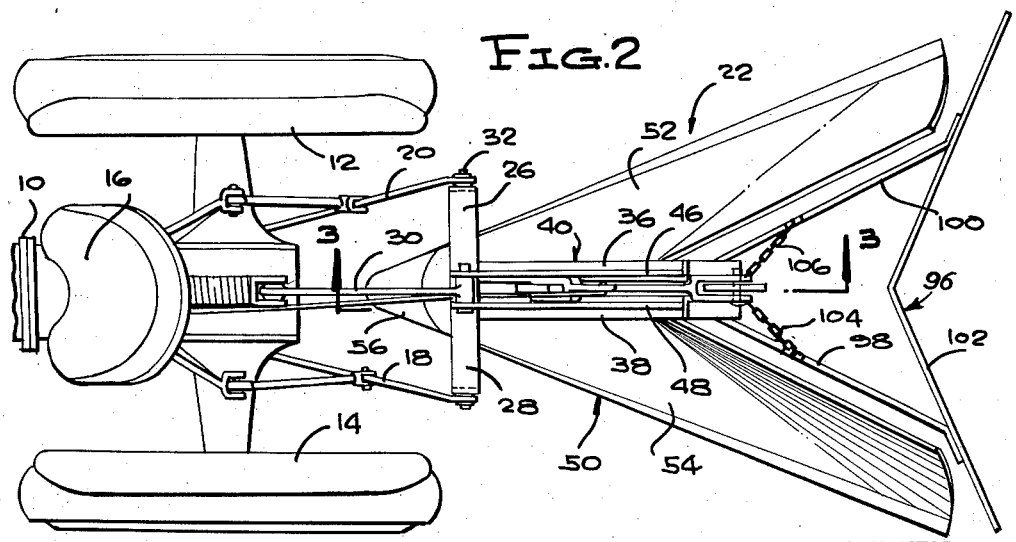
INVENTORS
DARRELL D. PERRY,
JOHN A. PERRY &
BY FLOYD B. PERRY
McMorrow, Berman + Davidson
ATTORNEYS May 2, 1961
D. D. PERRY ET AL
2,982,034
DITCHING ATTACHMENT
Filed May 22, 1959
2 Sheets-Sheet 2
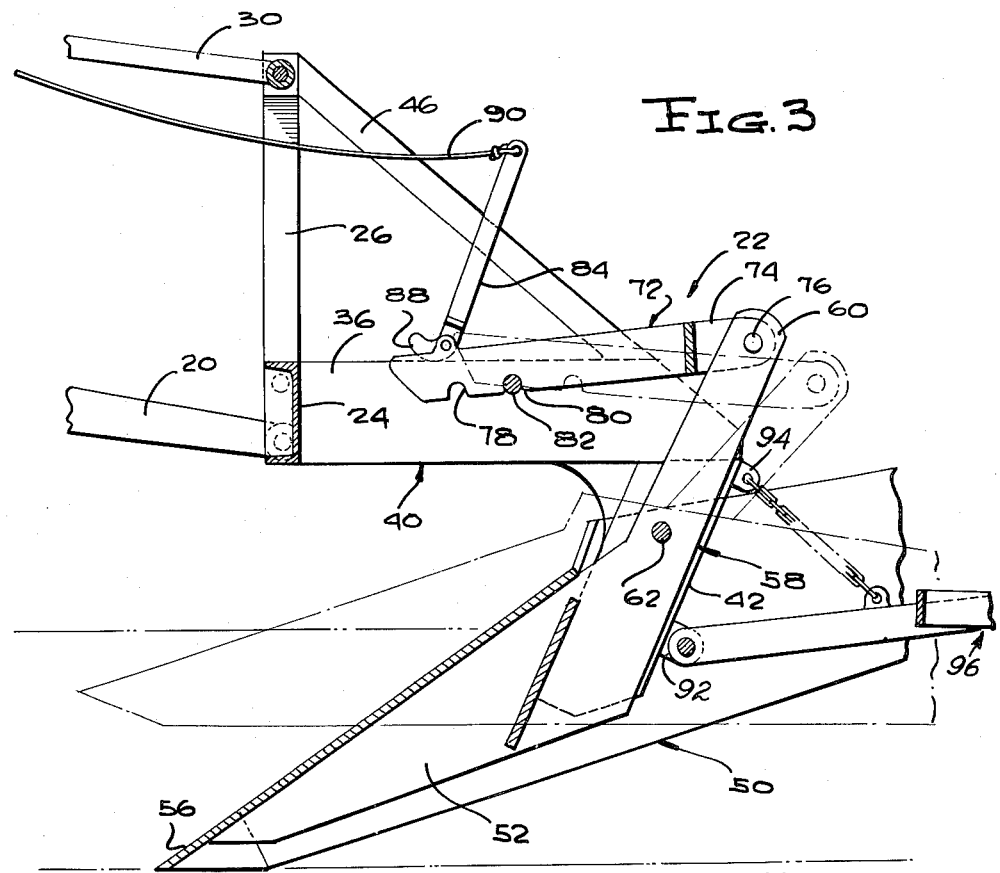
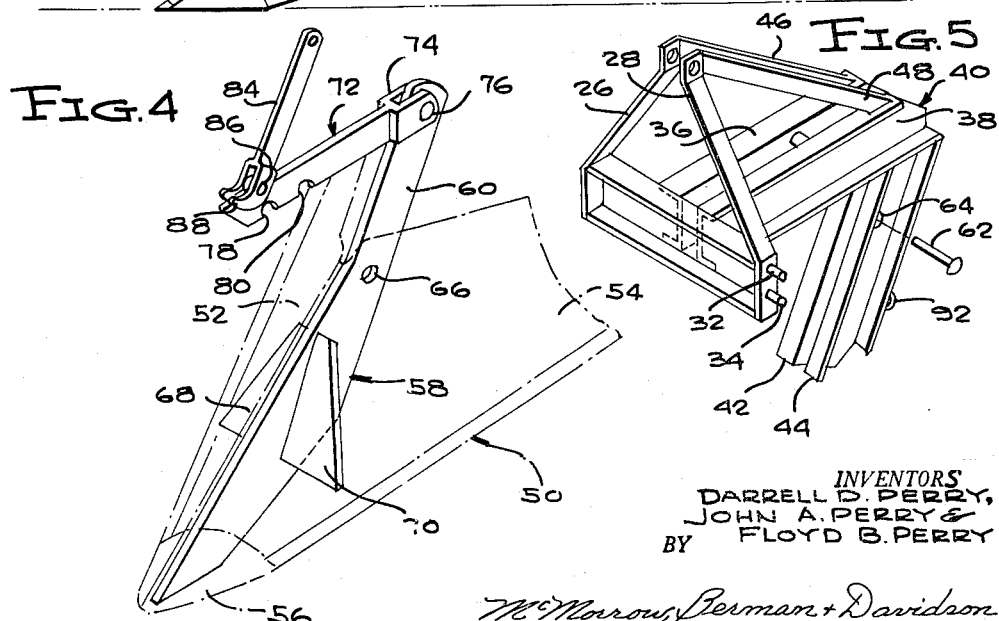
INVENTORS
DARRELL D. PERRY,
JOHN A. PERRY &
BY  FLOYD B. PERRY
McMorrow, Berman + Davidson
ATTORNEYS

United States Patent Office 2,982,034
Patented May 2, 1961

2,982,034
DITCHING ATTACHMENT

Darrell D. Perry, 240 Jefferson, Pocatello, Idaho; John A. Perry, Rte. 1, Wendell, Idaho; and Floyd B. Perry, Wendell, Idaho (462 Wildwood, Pocatello, Idaho)

Filed May 22, 1959, Ser. No. 815,142

4 Claims. (Cl. 37—98)

This invention relates to a ditching attachment for a work vehicle such as a tractor having a pair of lift arms rearwardly thereof.

Previously proposed and presently in use are ditching attachments for tractors each including a plow body having moldboards for spreading laterally the dirt dug from a ditch. Generally, such attachments are arranged for upward and downward movement with the implement lifting arms of the tractor. Such attachments are not fully acceptable for the reason that they tend to become clogged with debris when cutting a ditch in a ground surface having brush or weeds growing thereon. An operator of a tractor having such an attachment secured thereto must raise the attachment when filled with debris, dismount from the tractor seat, remove the debris by hand from the moldboards of the attachment, and remount the operator's seat of the tractor before continuing with the ditching operation.

An object of the present invention is to provide a ditching attachment which lends itself to self-cleaning when choked with debris without requiring manual removal of the debris from the moldboards.

Another object of the present invention is to provide a ditching attachment for a tractor having a plow body which may be moved from a ground-engaging position to a position out of engagement with the ground at the will of the operator of the tractor.

A further object of the present invention is to provide a ditching attachment for a tractor which lends itself to ready attachment to and detachment from the lift arms and compression link of the tractor, one which is sturdy in construction and having long life characteristics, one which lends itself to economical manufacture and assembly, and one which is highly effective in action.

These and other objects and advantages of the present invention will be fully apparent from the following description when taken in connection with the annexed drawings, in which:

Figure 1 is an elevational view of the rear end of a tractor with one wheel removed showing in full lines the attachment of the present invention in a ditch digging position, the dotted lines indicating the attachment in the raised or out of ditch-digging position.

Figure 2 is a plan view of the assembly shown in Figure 1.

Figure 3 is a view on an enlarged scale, taken on the line 3—3 of Figure 2.

Fig. 4 is an isometric view of a portion of the attachment, the dotted line showing indicating the nose and blades or moldboards of the plow body.

Figure 5 is an isometric view of the support portion of the attachment according to the present invention.

Referring in greater detail to the drawings in which like numerals indicate like parts throughout the several views, the reference numeral 10 designates generally the frame of a tractor having wheels 12 and 14, an operator's seat 16, and hydraulically operable lift arms 18 and 20 projecting rearwardly from the tractor.

The attachment of the present invention is designated generally by the reference numeral 22 and comprises a horizontally disposed draw bar 24, formed of channel steel positioned with its web vertical and its flanges facing forwardly. The open ends of the draw bar 24 are closed by the lower end portions of a pair of converging brace members 26 and 28 having their upper ends spaced apart from each other and adapted for securement to the free end of the compression link 30 of the tractor. Pins 32 and 34 project from the outer faces of the lower end portions of the brace members 26 and 28 and are adapted for selected positioning in the eye formations provided in the free ends of the lift arms 18 and 20, as shown in Figure 1 for pivotally connecting the ends of the drawbar 24 to the free ends of the lift arms 18 and 20.

Projecting rearwardly from the midportion of the draw bar 24 are laterally spaced channel members 36 and 38 constituting one leg of an approximately L-shaped beam 40. The other leg of the beam 40 is provided by other laterally spaced channel members 42 and 44 having their upper ends connected by welding or other suitable means to the adjacent ends of the channel members 36 and 38, respectively.

A pair of brace members 46 and 48 extend in an upwardly and forwardly sloping direction and have their lower ends fixedly secured by welding or other means to the upper flanges of the channel members 36 and 38. The upper ends of the brace members 46 and 48 are fixedly secured to the portions of the brace members 26 and 28 which form the attachment means for the compression link 30.

A plow body, designated generally by the reference numeral 50, has moldboards or blades 52 and 54 arranged in an upwardly and rearwardly sloping direction with the lower ends thereof converging together and joined to a plow nose 56 extending between and projecting forwardly from the converged ends of the blades 52 and 54.

A support 58 is fixedly secured to the under faces of the blades 52 and 54 intermediate the ends of the latter. The support has a portion 60 projecting upwardly between the diverging ends of the blades 52 and 54 and movable between the webs of the channel members 42 and 44 which comprise the other leg of the beam 40. The plow body 50 and beam 40 are positioned relative to each other with the beam longitudinally of the plow body and spaced above and adjacent the part of the plow contiguous to the plow nose 56.

Means, embodying a pivot pin 62, connects the portion 60 of the support 58 to the beam 40 inwardly of and adjacent the lower ends of the channel members 42 and 44 for rocking movement about the pin 62 as an axis disposed transversely of the beam 40. The pivot pin 62 extends through aligned holes 64 in the webs of the channel members 42 and 44 and through a hole 66 provided in the support 58.

A pair of plates 68 and 70 project perpendicularly from the portion of the support 58 below the hole 66. The plates 68 and 70 are conformably shaped to fit and fill the space between the support 58 and the adjacent inner faces of the blades 52 and 54. The adjacent flanges of the channel members 42 and 44 abut against the rearward faces of the plates 68 and 70 so that the plates 68 and 70 form abutment means on the portion of the support 58 secured to the under faces of the blades 52 and 54 engageable with the free end portion of the beam leg embodying the channel members 42 and 44 when the plow body 50 is in the ditching position. This affords a positive push for the plow body by the beam leg when the plow body is forming a ditch in a ground surface.

Cooperating latching means is provided on the one leg of the beam 40 and on the support 58 for releasably holding the support 58 at the limit of its movement in either the clockwise direction or the counterclockwise direction. Specifically, this means includes an arm 72 extending loosely between the webs of the channel members 36 and 38 and having one end bifurcated, as at 74, and provided with aligned holes receiving a pin 76 extending through a hole provided in the portion 60 of the support 58. Inwardly of the other end of the arm 72 and on the under face thereof are notches 78 and 80 selectively engageable with a pin 82 extending between and anchored in the webs of the channel members 36 and 38 intermediate the ends of the latter.

A lever 84 rises from the end of the arm 72 remote from the bifurcated end 74 and is pivotally connected adjacent its lower end by a pin 86 to the adjacent portion of the arm 72. The portion of the lever 84 below the pin 86 is provided with two cam-shaped feet 88 straddling the adjacent part of the arm 72 and engageable with the upper flanges of the channel members 36 and 38. Swinging movement of the lever 84 in the counterclockwise direction (Figure 3) serves to raise the arm 72 relative to the adjacent leg of the beam 40 so that the pin 82 is disengaged from the notch 78 or 80. An actuating cord 90 has one end fixed to the upper end of the lever 84 and the other end extends to a position accessible to the operator of the tractor when seated on the seat 16.

Two pairs of lugs 92 and 94 project from the rearward flanges of the channel members 42 and 44 and serve as an attaching means for a drag assembly 96. Converging bars 98 and 100 have their forward ends pivotally secured to the lugs 92 and support a V-shaped horizontally disposed bar 102 inwardly of its ends on their other ends. Chains 104 and 106 have their one ends secured to the bars 98 and 100, respectively intermediate the ends of the latter and have their other ends anchored in the lugs 94.

In operation, the ditching attachment of the present invention is readily attached to and detached from the lift arms 18 and 20 and the compression link 30 of a tractor. The operator of the tractor, by a suitable conventional control, controls the action of the lift arms for upward and downward movements so that the attachment 22 of the present invention may be moved from the full line position or ditching position (Figure 1) to the dotted line position out of ditching engagement with the ground surface.

The operator may lower the plow body 50 by the lift arms 18 and 20 and simultaneously shift the lever 84 to the position in which it raises the adjacent part of the arm 72 releasing the pin 82 from the notch 80 or 78. Upon engagement of the plow nose 56 on the ground surface the plow body 50 will be tilted in the clockwise direction resulting in shifting of the arm 72 rearwardly to a point where the pin 82 will engage in the notch 78. Release of the lever 84 at this point and raising of the attachment 22 will maintain the plow body 50 in a more or less horizontal position. Additionally, when the plow body 50 is in the more or less horizontal position the tractor may cross roadways, ditches, and the like without danger of catching the plow nose 56 in the ground surface which may be the case should the plow body 50 be left in the ditching position although raised above the ground surface.

The action of the blades 52 and 54, when the plow body 50 is in the ditching position is such that the dirt is carried upwardly from the sides of the bank of the ditch being dug and the bar 102 serves to sweep the dug earth outwardly of the banks and to level the same on the top of the banks providing a flat surface for the wheels of the tractor on its next course along the ditch for cleaning of the same in a rainy season.

What is claimed is:

1. The combination with a work vehicle having a pair of lift arms simultaneously movable upwardly and downwardly, said lift arm having adjacent ends which are free, of a ditching attachment comprising a plow body including a pair of blades arranged at an upwardly and rearwardly sloping diverging relation and a plow nose extending between and projecting forwardly from the convergent ends of said blades, a support fixedly secured to the under faces of said blades intermediate the ends thereof and having a portion projecting upwardly between the divergent ends of said blades, an approximately L-shaped beam positioned so that one of the legs is longitudinally of said plow body and spaced above said plow nose with the other of the legs extending in a downwardly direction between the divergent ends of said blades, a horizontally disposed drawbar extending transversely between said lift arms and having its ends pivotally connected to the free ends of said lift arms, the free end of said one leg being fixedly attached to said drawbar intermediate the ends of said drawbar, means connecting the projecting portion of said support to the other of the legs of said beam intermediate the ends of said other leg of said beam for rocking movement upon an axis transverse of said other leg of said beam and abutment means on the portion of said support secured to the under faces of said blades and engageable with the free end portion of said other leg of said beam when the plow body is in ditching position.

2. The combination with a work vehicle having a pair of lift arms simultaneously movable upwardly and downwardly, said lift arms having adjacent ends which are free, of a ditching attachment comprising a plow body including a pair of blades arranged at an upwardly and rearwardly sloping diverging relation and a plow nose extending between and projecting forwardly from the convergent ends of said blades, a support fixedly secured to the under faces of said blades intermediate the ends thereof and having a portion projecting upwardly between the divergent ends of said blades, an approximately L-shaped beam embodying a pair of channel members each having a web and flanges projecting from said web arranged so that the webs thereof are in spaced face-to-face relation on each side of said support with the flanges of one of said members facing away from the flanges of the other of said members, said beam being positioned so that one of the legs is longitudinally of said plow body and spaced above said plow nose with the other of the legs extending in a downwardly direction between the divergent ends of said blades, a horizontally disposed drawbar extending transversely between said lift arms and having its ends pivotally connected to the free ends of said lift arms, the free end of said one leg being fixedly attached to said drawbar intermediate the ends of said drawbar, a pivot pin extending through the projecting portion of said support and the webs of the other of the legs of said beam intermediate the ends of the webs of the other of the legs of said beam connecting the projecting portion of said support to said beam for rocking movement about said pin on an axis transverse of said other leg of said beam, and abutment means on the portion of said support secured to the under faces of said blades and engageable with the free end portion of said other leg of said beam when the plow body is in ditching position.

3. The combination with a work vehicle having a pair of lift arms simultaneously movable upwardly and downwardly, said lift arms having adjacent ends which are free, of a ditching attachment comprising a plow body including a pair of blades arranged at an upwardly and rearwardly sloping diverging relation and a plow nose extending between and projecting forwardly from the convergent ends of said blades, a support fixedly secured to the under faces of said blades intermediate the ends thereof and having a portion projecting upwardly between the divergent ends of said blades, an approximately L-shaped beam positioned so that one of the legs is longitudinally of said plow body and spaced above said plow nose with the other of the legs extending in a downwardly direction between the divergent ends of said blades, a horizontally disposed drawbar extending transversely between said lift arms and having its ends pivotally connected to said free ends of said lift arms, the free end of said one leg being fixedly attached to said drawbar intermediate the ends of said drawbar, means connecting the projecting portion of said support to the other of the legs of said beam intermediate the ends of said other leg of said beam for limited rocking movement in clockwise and counterclockwise direction about an axis transverse of said other leg of said beam, abutment means on the portion of said support secured to the under faces of said blades and engageable with the free end portion of said other leg of said beam when the plow body is in ditching position, and cooperating latching means on said one leg of said beam and on said support for releasably holding said support at the limit of either its clockwise or counterclockwise direction movement.

4. The combination with a work vehicle having a pair of lift arms simultaneously movable upwardly and downwardly, said lift arms having adjacent ends which are free, of a ditching attachment comprising a plow body including a pair of blades arranged at an upwardly and rearwardly sloping diverging relation and a plow nose extending between and projecting forwardly from the convergent ends of said blades, a support fixedly secured to the under faces of said blades intermediate the ends thereof and having a portion projecting upwardly between the divergent ends of said blades, an approximately L-shaped beam embodying a pair of channel members each having a web and flanges projecting from said web arranged so that the webs thereof are in spaced face-to-face relation on each side of said support with the flanges of one of said members facing away from the flanges of the other of said members, said beam being positioned so that one of the legs is longitudinally of said plow body and spaced above said plow nose with the other of the legs extending in a downwardly direction between divergent ends of said blades, a horizontally disposed drawbar extending transversely between said lift arms and having its ends pivotally connected to the free ends of said lift arms, the free end of said one leg being fixedly attached to said drawbar intermediate the ends of said drawbar, means connecting the projecting portion of said support to the other of the legs of said beam intermediate the ends of said other leg of said beam for limited rocking movement in clockwise and counterclockwise directions upon an axis transverse of said other leg of said beam, abutment means on the portion of said support secured to the under faces of said blades and engageable with the free end portion of said other leg of said beam when the plow body is in ditching position, an arm extending loosely between the webs of said one leg of said beam and having one end pivotally connected to the upper end of said support, and cooperating latching means on the other end of said arm and on the webs of said one leg for releasably holding said support at the limit of either its clockwise or counterclockwise direction movement.

References Cited in the file of this patent
UNITED STATES PATENTS

| | | |
|---|---|---|
| 2,527,613 | Zagurski | Oct. 31, 1950 |
| 2,552,292 | Metz et al. | May 8, 1951 |
| 2,864,181 | Simmons | Dec. 16, 1958 |
| 2,916,835 | Boyce | Dec. 15, 1959 |